United States Patent
Drake et al.

(10) Patent No.: US 12,487,194 B2
(45) Date of Patent: Dec. 2, 2025

(54) 3D PARTICLE ANALYSIS AND SEPARATION USING DUAL SEEDING

(71) Applicant: Carl Zeiss X-ray Microscopy, Inc., Dublin, CA (US)

(72) Inventors: Evan Drake, Dublin, CA (US); Matthew Andrew, Livermore, CA (US)

(73) Assignee: CARL ZEISS X-RAY MICROSCOPY, INC., Dublin, CA (US)

( * ) Notice: Subject to any disclaimer, the term of this patent is extended or adjusted under 35 U.S.C. 154(b) by 528 days.

(21) Appl. No.: 18/048,183

(22) Filed: Oct. 20, 2022

(65) Prior Publication Data

US 2023/0143179 A1 May 11, 2023

Related U.S. Application Data

(60) Provisional application No. 63/263,628, filed on Nov. 5, 2021.

(51) Int. Cl.
*G06K 9/00* (2022.01)
*G01N 23/046* (2018.01)
(Continued)

(52) U.S. Cl.
CPC ......... *G01N 23/046* (2013.01); *G01N 23/083* (2013.01); *G01N 33/24* (2013.01); *G06T 7/136* (2017.01); *G06T 7/168* (2017.01); *G06T 7/194* (2017.01); *G06T 7/60* (2013.01); *G06V 20/698* (2022.01); *G01N 2223/04* (2013.01); *G01N 2223/3306* (2013.01); *G01N 2223/419* (2013.01); *G01N 2223/616* (2013.01); *G06T 2207/10056* (2013.01);
(Continued)

(58) Field of Classification Search
CPC .... G01N 23/046; G01N 23/083; G01N 33/24; G01N 2223/3306; G01N 2223/419; G01N 2223/616; G06T 7/136; G06T 2207/10081; G06T 2207/30204; G06T 2207/10116; G06T 11/003; A61B 6/032
See application file for complete search history.

(56) References Cited

U.S. PATENT DOCUMENTS

2008/0205717 A1* 8/2008 Reeves ................ G06T 11/008
382/128
2014/0233692 A1* 8/2014 Case .................... G06F 3/04842
715/781

(Continued)

FOREIGN PATENT DOCUMENTS

CN 107133630 A * 9/2017 ............ G06K 9/40

OTHER PUBLICATIONS

Rabbani, Arash, Saeid Jamshidi, and Saeed Salehi. "An automated simple algorithm for realistic pore network extraction from microtomography images." Journal of Petroleum Science and Engineering 123 (2014): 164-171. (Year: 2014).*

(Continued)

*Primary Examiner* — Gregory A Morse
*Assistant Examiner* — Owais Iqbal Memon
(74) *Attorney, Agent, or Firm* — HoustonHogle LLP

(57) ABSTRACT

A multi scale material segmentation method is provided that creates markers to identify unique particles, for small and large particles independently, and then separately processes those markers.

20 Claims, 3 Drawing Sheets

(51) Int. Cl.
- *G01N 23/083* (2018.01)
- *G01N 33/24* (2006.01)
- *G06T 7/136* (2017.01)
- *G06T 7/168* (2017.01)
- *G06T 7/194* (2017.01)
- *G06T 7/60* (2017.01)
- *G06V 20/69* (2022.01)

(52) U.S. Cl.
CPC ............ *G06T 2207/10081* (2013.01); *G06T 2207/20021* (2013.01); *G06T 2207/20092* (2013.01); *G06T 2207/20212* (2013.01); *G06T 2207/30204* (2013.01)

(56) References Cited

U.S. PATENT DOCUMENTS

| | | | | |
|---|---|---|---|---|
| 2016/0170088 | A1* | 6/2016 | Grader | G06F 30/20 703/6 |
| 2020/0005013 | A1* | 1/2020 | Zhao | G06V 20/695 |
| 2021/0182597 | A1 | 6/2021 | Andrew | |

OTHER PUBLICATIONS

Furat, Orkun, et al. "Description of ore particles from XMT images, supported by SEM-based image analysis." arXiv preprint arXiv:1806.03239 (2018). (Year: 2018).*

Alam, Md Ferdous, and Asadul Haque. "A new cluster analysis-marker-controlled watershed method for separating particles of granular soils." Materials 10.10 (2017): 1195. (Year: 2017).*

Tilo Strutz, "The Distance Transform and its Computation", Technical paper, Jun. 2021, TECHP/2021/06 Leipzig University of Telecommunication, 24 pages.

Rabbani et al., "An automated simple algorithm for realistic pore network extraction from micro-tomography images", Journal, 2014, J. Pet. Sci. Eng. 123, 469 164-171, 8 Pages.

"Andrew et al., ""The Imaging of Dynamic Multiphase Fluid Flow Using Synchrotron-Based X-ray Microtomography at Reservoir Conditions"", Transp. Porous Media 110, Aug. 20, 2015, 24 Pages".

Wildenschild et al., "X-ray imaging and analysis techniques for quantifying pore-scale structure and processes in subsurface porous medium systems", Adv. Water Resour. 51, 217-246, 2013, 30 Pages.

Beucher et al."Use of watersheds in Contour Detection. in International workshop on image processing: real-time edge and motion detection/estimation", 1979, 12 Pages.

P. Soille, "Morphological Image Analysis: Principles and Applications", Chapter 6, 2nd edition, ISBN 3540429883, 2003.

European Search Report, completed on Sep. 6, 2023, from European Application No. 22075017.8. 11 pages.

Byholm, T. et al,, "The application of morphological algorithms on 3-dimensional porous structures for identifying pores and gathering statistical data," Proceedings of the 6th WSEAS International Conference on Simulation, Modeling and Optimization, Sep. 22, 2006. 264-270.

Rabbani, A. et al., "Pore network extraction using geometrical domain decomposition," Advances in Water Resources, vol. 123, Nov. 17, 2018, 70-83.

* cited by examiner

3D PARTICLE ANALYSIS AND SEPARATION USING DUAL SEEDING

RELATED APPLICATIONS

This application claims the benefit under 35 USC 119(e) of U.S. Provisional Application No. 63/263,628, filed on Nov. 5, 2021, which is incorporated herein by reference in its entirety.

BACKGROUND OF THE INVENTION

Various imaging modalities have been used to identify and visualize mineral content of rocks, both in two dimensions (2D) and in three dimensions (3D). For example, these imaging modalities can analyze rock samples from extraction operations to determine porosity and mineralogy for exploration and production operations in the Oil and Gas industry, or determine comminution statistics for the mining industry.

In typical operation, these imaging modalities create image datasets such as 3D volumes or 2D images. Image analysis techniques are then employed to infer grain characteristics and mineral content from the volumes and the images.

Non-destructive imaging systems include x-ray computed tomography (CT) microscopy and Scanning Electron Microscopy (SEM) systems. These systems provide the ability to visualize features such as pores, organics and minerals in the samples.

The X-ray CT microscopy systems irradiate the sample with x-rays, typically in a range between 1 and several hundred keV. 2D projection images are collected at multiple angles and a 3D volume of the sample is reconstructed from the projections.

One current imaging analysis technique creates a 3D mineral map of the sample by analyzing volume image datasets of a sample created from x-ray imaging systems. A total mineral content of the sample is then defined, and x-ray attenuation coefficients are calculated for the defined minerals. The technique then segments the grey scale 3D images by identifying characteristic grey scale levels in the images corresponding to the calculated x-ray attenuation coefficients.

Another imaging analysis technique employs multi-phase segmentation of 3D x-ray tomography volume image datasets. The 3D x-ray tomography volumes are processed to obtain standardized intensity grey scale images, which are then segmented into at least 3 phases. The segmentation steps include computing a median/mean-filtered-gradient image of the standardized intensity image, creating an intensity vs. gradient graph from the median/mean-filtered-gradient image and the standardized intensity image, partitioning the intensity vs. gradient graph into at least 3 regions, and using thresholds defining the regions to segment the standardized grey scale image to create the segmented image. Then, volumetric fractions and spatial distributions of the segmented phases are calculated and compared with target values.

SUMMARY OF THE INVENTION

Segmentation is also a challenge when analyzing samples with small grains or even powders when a range of particle sizes are present in the sample. Therefore, multiscale segmentation approaches are required in this domain.

In general, according to one aspect, the invention features a sample segmentation method. This method comprises generating one or more volume datasets of a sample, binarizing the dataset into areas classified as background and particles to create a binary image, generating a distance transform image from the binary image, creating markers to identify unique particles, for at least two particle size classifications within the sample independently, and dilating the markers to merge into particles.

Preferably, the markers for the different particle sizes are processed differently.

A composite image can be created by overlying an image for smaller particles and an image for larger particles.

With respect to large particles, the distance image can be thresholded and any small objects can be removed to create the large markers. Then, for the small particles, the distance transform image is run through an H-max algorithm.

In the preferred embodiment, a user can change threshold values and measurements and statistics are calculated for the particles, such as minor and major axis length, total volume, surface area, sphericity, and association measurements.

In general, according to one aspect, the invention features an x-ray microscopy CT system, comprising: a source of generating x-rays, a sample holder for holding and rotating samples in the beam, and a detector for detecting the beam after interaction with the samples. The system further has a computer for receiving projections from the detector and generating one or more volume datasets of samples, and segmenting slices of the volume datasets by binarizing the dataset into areas classified as background and particles to create a binary image, generating a distance transform image from the binary image, creating markers to identify unique particles, for at least two particle size classifications within the sample independently, and dilating the markers to merge into particles.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
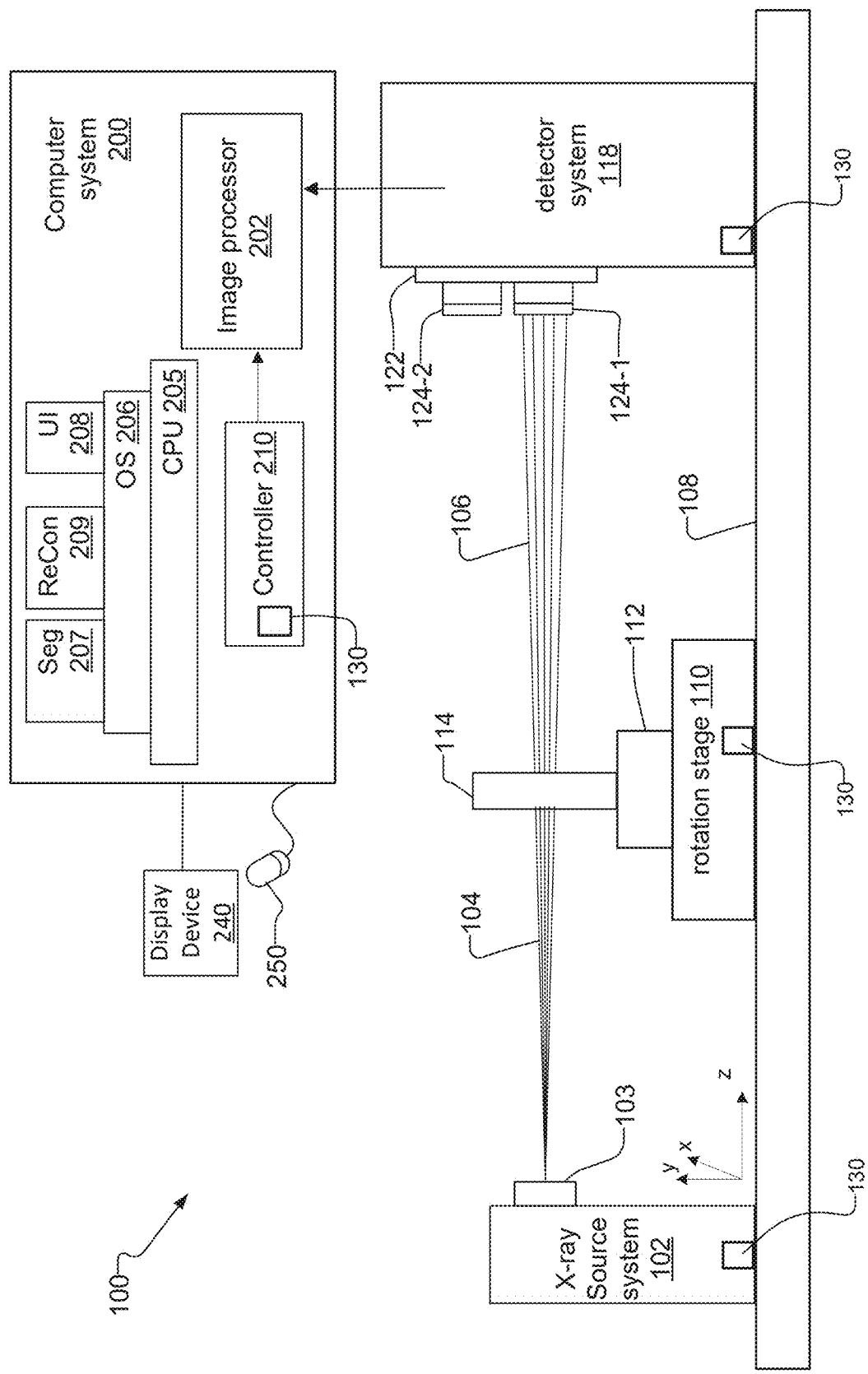
FIG. 1 is a schematic diagram of an x-ray CT system to which the present invention is applicable.

FIG. 1 is a schematic diagram of an x-ray CT system 100 on which the present invention can be implemented.

In general, the x-ray CT system 100 includes an x-ray source system 102 that generates an often polychromatic x-ray beam 104 and a rotation and positioning stage 110 with sample holder 112 for holding the sample 114 in the x-ray beam 104 from the x-ray source system 102. Images or x-ray projections are captured by a detector system 118. The x-ray source system 102, the rotation and positioning stage 110, and the detector system are mounted to a base 108 of the x-ray CT system 100. A computer system 200 typically receives and processes these images or projections and provides general control of the system 100. The computer system 200 possibly along with a special purpose graphics processor will typically perform tomographic reconstruction using the x-ray projections.

The x-ray source 102, in one example, is a polychromatic x-ray source. Laboratory x-ray sources are often used because of their ubiquity and relatively low cost. Nonetheless, synchrotron sources or accelerator-based sources are other alternatives.

Common laboratory x-ray sources include an x-ray tube, in which electrons are accelerated in a vacuum by an electric field and shot into a target piece of metal, with x-rays being emitted as the electrons decelerate in the metal. Typically, such sources produce a continuous spectrum of background x-rays (i.e. bremsstrahlung radiation) combined with sharp peaks in intensity at certain energies that derive from the characteristic lines of the target, depending on the type of metal target used.

In one example, the x-ray source 102 is a rotating anode type or micro focused source, with a Tungsten target. Targets that include Molybdenum, Gold, Platinum, Silver or Copper also can be employed. A transmissive configuration of the x-ray source 102 can be used in which the electron beam strikes the thin target 103 from its backside. The x-rays emitted from the other side of the target 103 are then used as the beam 104. Reflection targets are another option.

The x-ray beam 104 generated by source 102 has an energy spectrum that is controlled typically by the operating parameters of the source. In the case of a laboratory source, important parameters include the material of the target and the acceleration voltage (kVp). The energy spectrum is also dictated by any conditioning filters that suppress unwanted energies or wavelengths of radiation. For example, undesired wavelengths present in the beam can be eliminated or attenuated using, for instance, an energy filter (designed to select a desired x-ray wavelength range/bandwidth).

In addition to the x-ray source 102, filters are sometimes useful for filtering the x-ray beam 104 before interaction with the sample 114 (pre-filters).

When the sample 114 is exposed to the x-ray beam 104, the x-ray photons transmitted through the sample form an attenuated x-ray beam 106 that is received by the spatially resolved detector system 118.

In the most common configuration of the detector system 118, a magnified projection image of the sample 114 is formed on the detector system 118 with a geometrical magnification that is equal to the inverse ratio of the source-to-sample distance and the source-to-detector distance. Generally, the geometrical magnification provided by the x-ray stage is between 2× and 100×, or more. In this case, the resolution of the x-ray image is limited by the focus spot size or virtual size of the x-ray source system 102.

To achieve high resolution, an embodiment of the x-ray CT system 100 further utilizes a very high resolution detector 124-1 of the detector system 118 in conjunction with positioning the sample 114 close to the x-ray source system 102. In one implementation of the high-resolution detector 124-1, a scintillator is used in conjunction with a microscope objective to provide additional magnification in a range between 2× and 100×, or more.

Other possible detectors can be included as part of the detector system 118 in the illustrated x-ray CT system 100. For example, the detector system 118 can include a lower resolution detector 124-2, as shown in the illustrated embodiment of FIG. 1. This could be a flat panel detector or a detector with a lower magnification microscope objective, in examples. Configurations of one, two, or even more detectors 124 of the detector system 118 are possible.

Preferably, two or more detectors 124-1, 124-2 are mounted on a turret 122 of the detector system 118, so that they can be alternately rotated into the path of the attenuated beam 106 from the sample 114.

Typically, based on operator defined parameters, the controller 210 of the computer system 200 instructs the rotation stage 110 via the control interface 130 to move the sample 114 out of the beam path during x-ray source system 102 calibration. After completion of the calibration portion, the controller 210 moves the sample 114 back into the beam path and rotates the sample 114 relative to the beam 104 to perform the CT scan of the sample 114.

In one example, the computer system 200 includes an image processor 202 that accelerates the analysis of the x-ray projections and possibly performs the calculations necessary for tomographic reconstructions created from the x-ray projections. A display device 240, connected to the computer system 200, displays information from the x-ray CT system 100. An input device 250 such as a touch screen, keyboard, and/or computer mouse enables interaction between the operator, the computer system 200, and the display device 240.

A user interface application 208 executes on an operation system 206 that controls access to a central processing unit CPU 205 of the computer system 200. In one example, the operator defines/selects CT scan or calibration parameters via the user interface 208. These include x-ray acceleration voltage settings, and settings for defining the x-ray energy spectrum of the scan and exposure time on the x-ray source system 102. The operator also typically selects other settings such as the number of x-ray projection images to create for the sample 114, and the angles to rotate the rotation stage 110 for rotating the sample 114 for an x-ray CT scan in the x-ray beam 104, along with the positioning of the sample in the beam along the x, y, and z axes.

The computer system 200, with the assistance of its image processor 202, accepts the image or projection information from the detector system 118 associated with each rotation angle of the sample 114. The image processor 220 creates a separate projection image for each rotation angle of the sample 114, and combines the projection images using CT reconstruction algorithms 209 to create 3D tomographic reconstructed volume information for the sample.

In addition, a segmentation application 207 also runs on the operating system 206 and the CPU 205. This is used to segment the different features, such as particles, within the sample, which is often in the form of a powder, and to identify and otherwise analyze those particles to automatically generate comminution statistics, for example.

Figure 2:
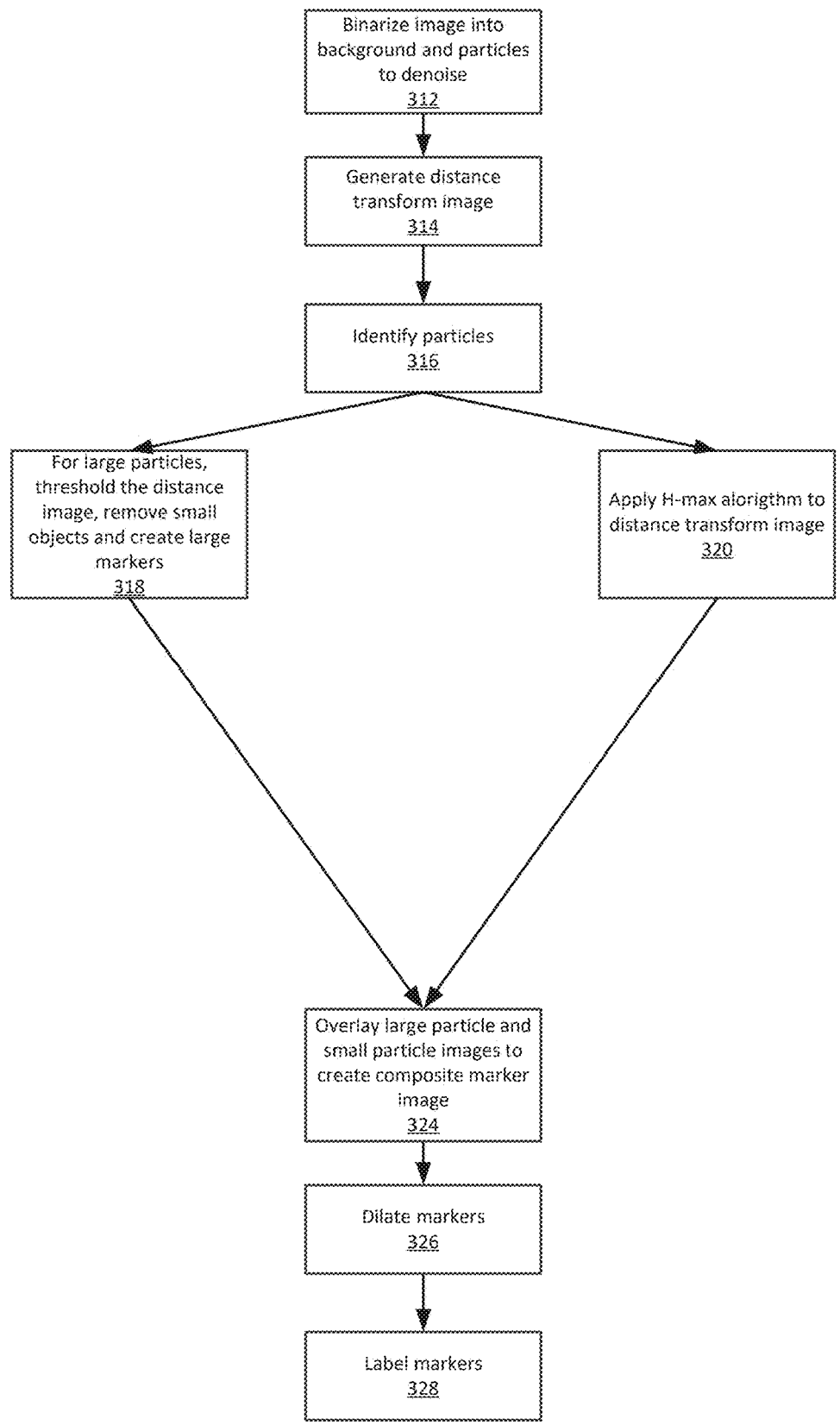
FIG. 2 is a flow diagram showing a process for segmentation executed by a computer system.

FIG. 2 shows a process for segmentation employed by the segmentation application 207.

The first step is to segment or binarize the dataset into areas classified as background and particles in step 312.

Then the distance transform image is produced from this binary image in step 314. An appropriate Euclidian distance transform is described in Strutz, The Distance Transform and its Computation June, 2021, TECHP/2021/06, arXiv: 2106.03503v1.

From there, markers are created and used to identify unique particles, for small and large particles independently in step 316. The following articles describe appropriate possible implementations: Rabbani, A., Jamshidi, S. & Salehi, S. An automated simple algorithm for realistic pore network extraction from micro-tomography images. J. Pet. Sci. Eng. 123, 469 164-171 (2014); Andrew, M. G., Menke, H. P., Blunt, M. J. & Bijeljic, B. The Imaging of Dynamic Multiphase Fluid Flow Using Synchrotron-Based X-ray Microtomography at Reservoir Conditions. Transp. Porous Media 110, 1-24 (2015); Wildenschild, D. & Sheppard, A. P. X-ray imaging and analysis techniques for quantifying pore-scale structure and processes in subsurface porous medium systems. Adv. Water Resour. 51, 217-246 (2013), Beucher, S. & Lanteujoul, C. Use of watersheds in Contour Detection. in International workshop on image processing: real-time edge and motion detection/estimation (1979). See also U.S. Pat. Appl. No. US 20210182597 A1 by Matthew Andrew, which is incorporated herein by this reference.

For the large particles, the distance transform image is thresholded and any small objects are removed to create the large markers in step 318 to produce a thresholded distance image.

For the small particles, the distance transform image is run through the H-max algorithm in step 320. Soille, P., "Morphological Image Analysis: Principles and Applications" (Chapter 6), 2nd edition (2003), ISBN 3540429883 describes an appropriate approach for generating the H-max image.

Then these two sets of images, the thresholded distance image and the H-max image, are overlayed in step 324. This yields a composite marker image that covers both large and small particles.

The markers are then dilated to merge any that are not touching each other but are indicating the same particle in step 326. This helps address any over separation that might occur.

Finally the independent markers are labeled and the distance transform image is flooded using this labelled marker image in step 328.

Figure 4:
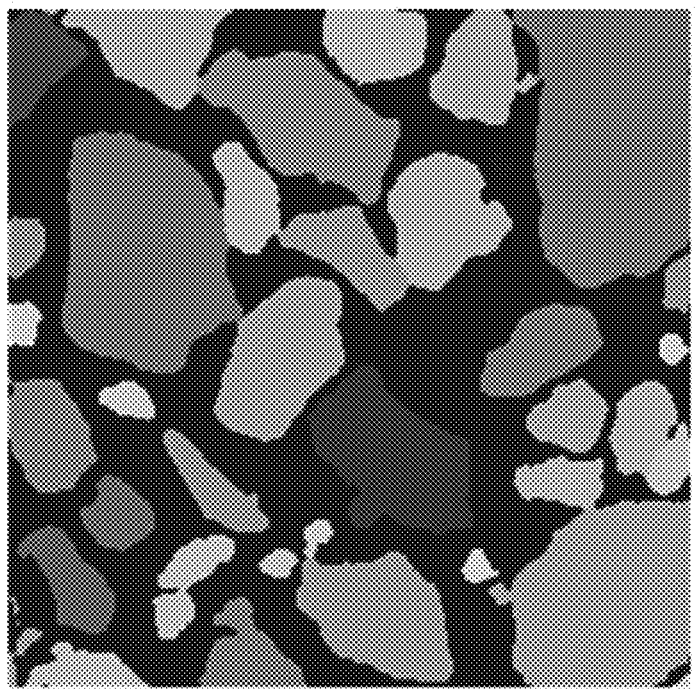
FIG. 4 is the slice of a 3D mineral dataset depicted in FIG. 3 after having undergone particle separation as displayed on the display device of the computer system.
Figure 3:
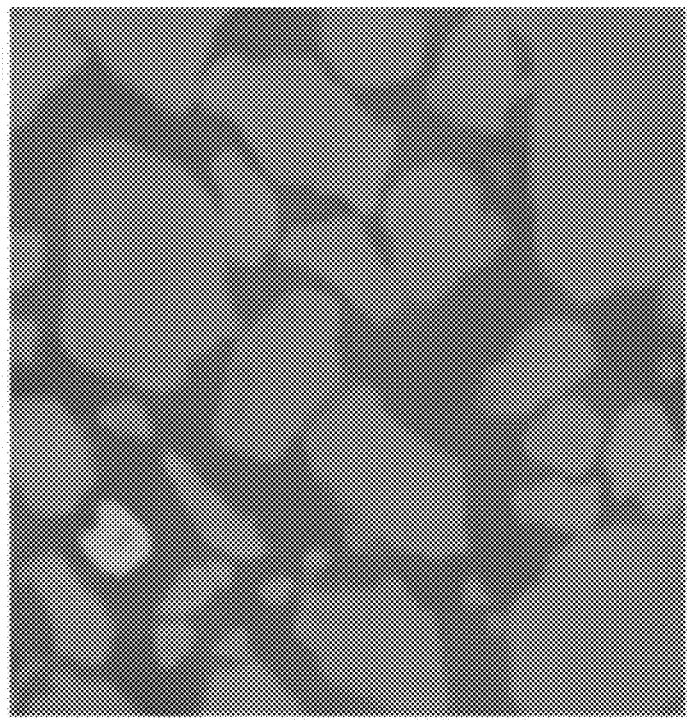
FIG. 3 is a slice of a 3D mineral dataset as displayed on a display device of the computer system.

The output of that is a label dataset where each particle is assigned a unique value as shown in FIG. 4, when starting from a slice from a 3D mineral dataset as shown in FIG. 3.

To allow for flexibility, the segmentation application allows the user to change a few of the parameters like the threshold value applied to the distance transform image to optimize the final label image.

After the dataset has gone through particle separation, the method then begins recording and calculating a number of relevant measurements and statistics. This is done for both the particles as well as grains. Some of the outputted 3D measurements include minor and major axis length, total volume, surface area, sphericity, etc. as well as association measurements as to what phase certain grains are in contact with.

While this invention has been particularly shown and described with references to preferred embodiments thereof, it will be understood by those skilled in the art that various changes in form and details may be made therein without departing from the scope of the invention encompassed by the appended claims.

What is claimed is:

1. A sample segmentation method, comprising:
generating one or more volume datasets of a sample;
binarizing the dataset into areas classified as background and particles to create a binary image;
generating a distance transform image from the binary image;
creating markers to identify unique particles, for at least two particle size classifications within the sample independently; and
dilating the markers to merge into particles.

2. The method of claim 1, wherein the markers for the different particle sizes are processed differently.

3. The method of claim 1, further comprising creating a composite image by overlying an image for smaller particles and an image for larger particles.

4. The method of claim 1, wherein for large particles, the distance image is thresholded and any small objects are removed to create the large markers.

5. The method of claim 4, wherein for the small particles, the distance transform image is run through an H-max algorithm.

6. The method of claim 1, further comprising allowing a user to change threshold values.

7. The method of claim 1, further comprising calculating measurements and statistics for the particles.

8. The method of claim 7, wherein the measurements and statistics include minor and major axis length, total volume, surface area, sphericity, and association measurements.

9. An x-ray microscopy CT system, comprising:
a source of generating x-rays;
a sample holder for holding and rotating samples in the beam;
a detector for detecting the beam after interaction with the samples; and
a computer for receiving projections from the detector and generating one or more volume datasets of samples, and segmenting slices of the volume datasets by binarizing the dataset into areas classified as background and particles to create a binary image, generating a distance transform image from the binary image, creating markers to identify unique particles, for at least two particle size classifications within the sample independently, and dilating the markers to merge into particles.

10. The system of claim 9, wherein the computer processes the markers for the different particle sizes differently.

11. The system of claim 9, wherein the computer creates a composite image by overlying an image for smaller particles and an image for larger particles.

12. The system of claim 9, wherein the computer thresholds the distance image for large particles and removes any small objects to create the large markers.

13. The system of claim 12, wherein the computer applies an h-max algorithm to the distance transform image for the small particles.

14. The system of claim 9, wherein the computer allows a user to change threshold values.

15. The system of claim 9, wherein the computer calculates measurements and statistics for the particles.

16. The system of claim 15, wherein the measurements and statistics include minor and major axis length, total volume, surface area, sphericity, and association measurements.

17. The method of claim 1, wherein for large particles, the distance transform image is thresholded and any small objects are removed to create a large particle image according to which markers are generated for large particles, and generate a small particle image from the removed small objects.

18. The method of claim 17, wherein an H-maximum algorithm is applied to the small particle image to generate markers for small particles, and a composite image is created by overlying the small particle image and the large particle image.

19. The system of claim 9, wherein for large particles, the distance transform image is thresholded by the computer and any small objects are removed to create a large particle image according to which markers are generated for large particles, and generate a small particle image from the removed small objects.

20. The system of claim 19, wherein an H-maximum algorithm is applied by the computer to the small particle image to generate markers for small particles and a composite image is created by overlying the small particle image and the large particle image.

* * * * *